United States Patent [19]

Lofink

[11] Patent Number: 4,916,949
[45] Date of Patent: Apr. 17, 1990

[54] GAS FLOW METER

[76] Inventor: Joseph P. Lofink, 979 Lake Shore Dr., Hebron, Ohio 43205

[21] Appl. No.: 346,633

[22] Filed: May 3, 1989

[51] Int. Cl.$^4$ .............................................. G01F 3/10
[52] U.S. Cl. ........................................ 73/261; 73/273
[58] Field of Search ................ 73/198, 201, 253, 261, 73/273, 280, 861.79, 861.87, 861.88, 861.97, 861.92, 861.94

[56] References Cited

U.S. PATENT DOCUMENTS

| | | | |
|---|---|---|---|
| 427,486 | 5/1890 | Thompson | 73/201 |
| 1,528,728 | 3/1925 | Houghton et al. | 73/261 |
| 1,821,895 | 9/1931 | Owens | 73/261 X |
| 3,071,003 | 1/1963 | Brette | 73/273 X |
| 4,406,163 | 9/1983 | Lofink . | |

Primary Examiner—Herbert Goldstein
Attorney, Agent, or Firm—Sidney W. Millard

[57] ABSTRACT

A meter is mounted inside a housing where the meter is designed for low pressure gas flow measurement and the housing is designed to withstand high pressure differentials. The meter itself includes a plurality of divided chambers and one chamber includes moving elements to measure the flow of gas between the inlet and the outlet. The moving elements inside the gas transmission chamber are supported in place in bearings mounted in dividing walls. Chambers on each side of the dividing walls which define the gas transmission chamber include oil slingers which dip into puddles of oil in the bottom of the chambers and fling a fan of oil upward to lubricate the bearings and other moving parts.

20 Claims, 3 Drawing Sheets

GAS FLOW METER

FIELD OF THE INVENTION

This invention relates to meters designed for low pressure gas measurement which are modified for use where o there is a high pressure differential between the volume of gas being measured and the external environment.

Background of the Invention

Gas flow meters are usually designed with a plurality of moving parts encased within an enclosure where the enclosure is designed to maintain structural stability between a maximum rated high internal pressure and external atmospheric pressure. As a consequence, high pressure meters are heavy, bulky and expensive.

An improvement in this generalized arrangement to allow the use of a meter designed for low pressure differentials to be used in a high pressure gas system was patented by the inventor of this invention in U.S. Pat. No. 4,406,163. The patent describes a low pressure meter mounted on a plate which plate seals the open end of a containment vessel. The containment vessel is designed to withstand high pressure differentials between the inside and the outside. The result is that gas pressure within the containment vessel will be of high pressure and the pressure within the meter will be at essentially the same pressure. Therefore, there is very little pressure differential between the inside and outside of the meter even though there may be a pressure differential of several hundred pounds per square inch between the inside and outside of the containment vessel. Because there is very little pressure differential between the inside and outside of the meter there is no pressure differential to distort the meter housing nor the internal parts thereof. Thereby, a relatively inexpensive low pressure meter can be used to measure volume flow rates of gas which may be at a pressure of several hundred pounds per square inch.

The problem of transmitting the information from the meter mounted inside the containment vessel to an outside location where it may be read by a meter reader has been solved by industry in a plurality of ways and at least one is described in the aforementioned patent to this same inventor.

Lubricating the parts of the meter by conventional means is not an option. The containment vessel must be gas tight to prevent leakage. So there is no conventional way to lubricate the moving parts of the meter without stopping gas flow and disassembling the containment vessel.

SUMMARY OF THE INVENTION

In this invention a gas flow meter is mounted on a plate and the plate in turn is sealingly secured to the open end of a cup-shaped housing or containment vessel. A coupling of conventional design is mounted on the plate to allow meter measurements taken inside the containment vessel to be conveyed through the plate to the exterior of the containment vessel for observation by a meter reader.

The containment vessel includes an inlet opening and an outlet opening and the meter includes a gas inlet and an outlet. The outlet from the gas meter is mounted to discharge gas which has passed through the meter directly through the outlet opening of the containment vessel. The outlet of the meter is sealingly engaged with the containment vessel outlet opening such that gas inside the containment vessel does not leak through the outlet opening.

Within the meter itself are two rotating shafts mounted in parallel to mount elements of a ROOTS type meter, ROOTS is a trademark of Dresser Industries, Inc.

A ROOTS type meter is a known design in the industry and it is structured to meter the flow of gases and gas mixtures. It employs rotary displacement impellers which are machined to rotate in a rigid measuring chamber.

The two shafts mounting the impellers are geared together at one or both ends for obvious reasons. One shaft is coupled to a counter and the counting information is passed through the plate to external apparatus which will convert the rotation information to standard cubic feet of gas passing through the meter. A pressure and temperature tap will be provided in the housing or containment vessel and the information is connected to a volume corrector which is a known piece of apparatus in the industry. The temperature, pressure and mechanical output shaft are all connected to the volume corrector and the resulting standard cubic feet of gas is displayed or printed as may be desired by the operator.

It is conventional for the ROOTS meter to be assembled as a plurality of parts making up the meter enclosure. Wall means are provided within the enclosure to divide the interior of the meter into discrete chambers. One chamber is designed for the passage of gas from the meter inlet to the meter outlet and the impellers are located within the gas transmission chamber and driven in rotational fashion by the gas pressure differential between the meter inlet and the meter outlet.

In the preferred embodiment of this invention, the shafts supporting the impellers project through the dividing walls in the meter and are supported in the wall means by ball bearings and the like. The shafts are in horizontal position with one shaft being above the other. The aforementioned gears mounted on one end of each shaft are housed within one of the chambers formed within the meter enclosure and the gear teeth mesh to keep the impellers properly oriented. The gear on the lower of the two shafts includes a circumferentially extending oil slinger which projects radially beyond the teeth of the gear to which it is attached. The oil slinger is essentially a disk with a hole in the center.

Oil is supplied to the chamber having the oil slinger and of a depth where the oil slinger at its lowest point will be immersed in the oil but the gear on which the oil slinger is mounted preferably does not impinge on the oil surface. Thereby, when the meter is operating and the gear rotating, the oil slinger will dip into the puddle of oil in the bottom of the chamber and due to centrifugal force will fling oil from its periphery in a wide fan which will ultimately lubricate the gears and ball bearings of the system.

A sight glass is mounted at an oil reservoir adjacent the plate and the reservoir is in fluid communication with the oil within the chamber. An oil filling passage is provided into the reservoir area from a place outside the plate so that oil may be added to the oil chamber from outside the housing while the meter is in operation.

As a safety feature, a choke is provided for use with the meter at the outlet opening of the housing which will restrict gas flow through the meter to about 120% of the flow rating of the gas meter. Thereby, it will be impossible for the operator of the apparatus to overextend and destroy the meter unless, of course, he removes the choke which would be contrary to operating instructions.

Objects of the invention not clear from the above will be obvious from a review of the drawings and the description of the preferred embodiments which follows.

DESCRIPTION OF THE PREFERRED EMBODIMENTS

Figure 1:
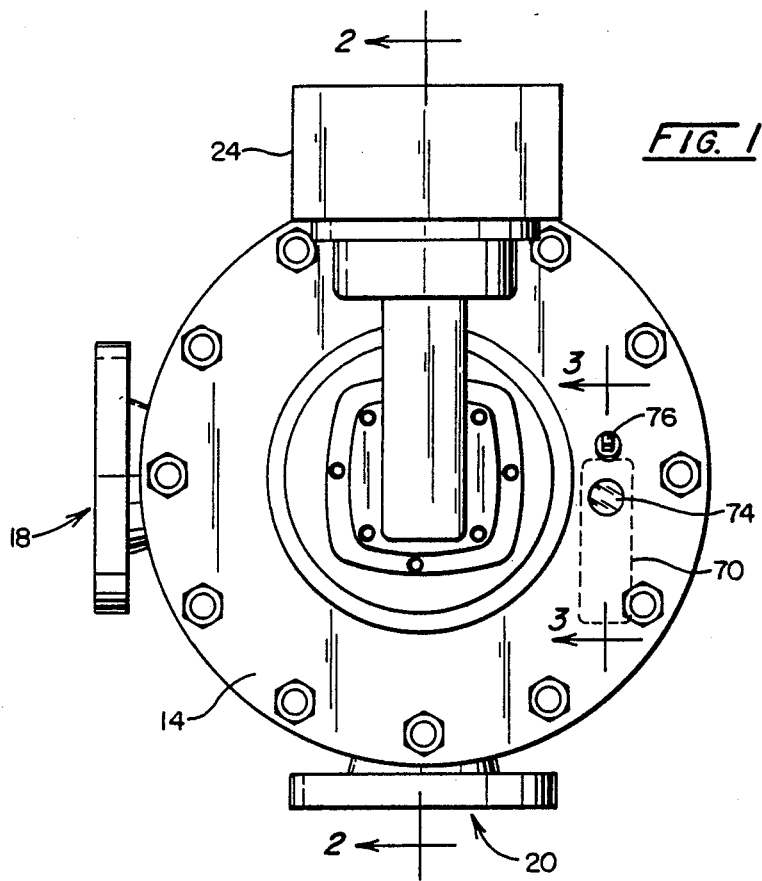
FIG. 1 is an end elevational view of the meter of this invention.
Figure 2:
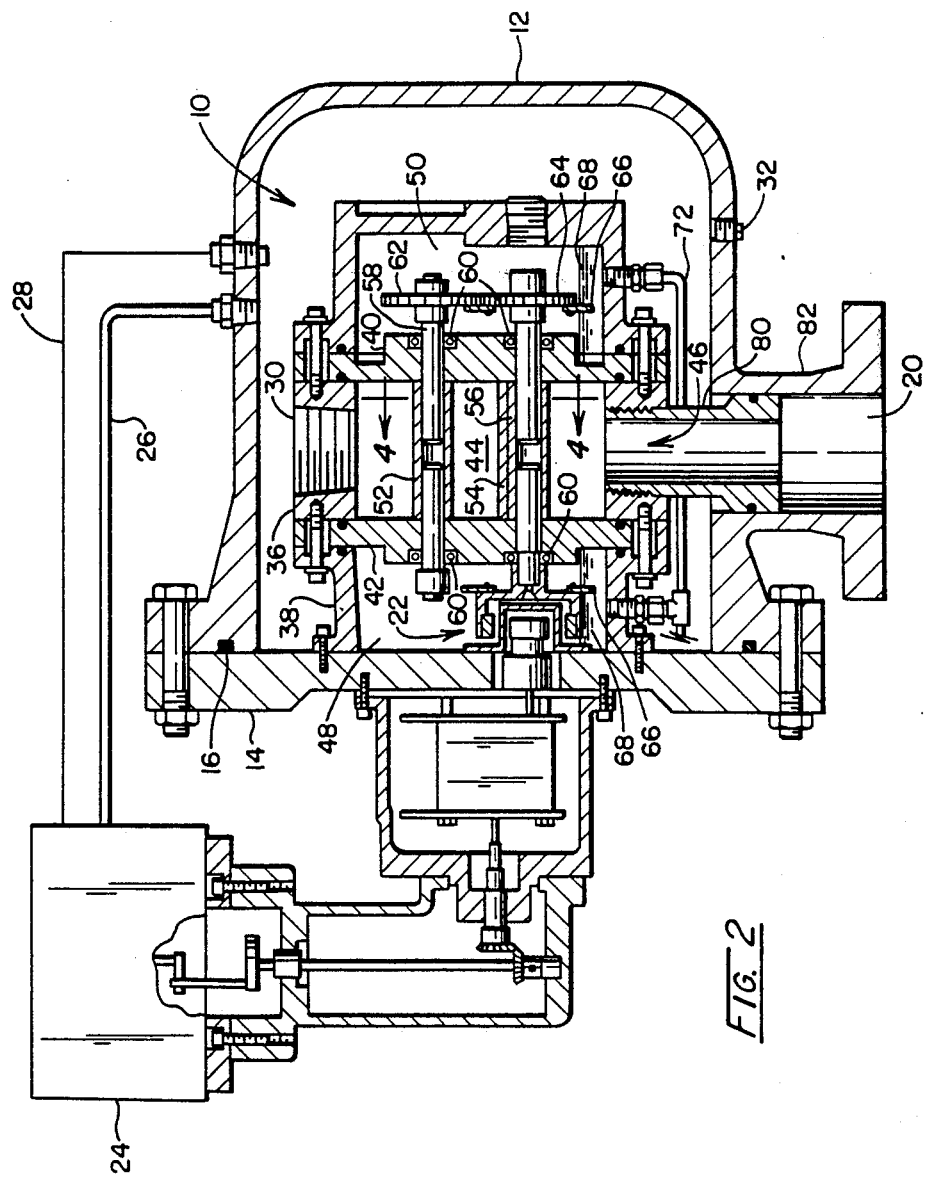
FIG. 2 is a sectional view taken along line 2—2 of FIG. 1.

Looking to FIGS. 1 and 2, a gas flow meter is designed to use meter structure intended for use with low pressure differentials between the interior and exterior of the meter itself. However, the meter is modified to allow this low pressure rated meter to operate satisfactory at high pressure differentials. The meter itself is indicated generally at 10 and it is mounted within a cup-shaped housing 12 having a plate 14 bolted to one end. An annular groove 16 is cut in one face of the housing at the mating surfaces between the housing 12 and the plate 14, the groove holding an elastomeric seal to prevent gas leakage between the relatively high pressure on the interior of housing 12 as opposed to the atmospheric pressure outside the housing. By way of example, pressures inside the housing may be 1,500 psi or higher and the pressure differential between the inlet opening 18 into the housing 12 and the outlet opening 20 may be in the range of 20-25 psi. Because we have essentially the same pressure inside the meter 10 as we have on the exterior of the meter inside the housing 12, we are able to use a meter 10 which is rated for a maximum pressure of about 175 psi.

A magnetic coupling revolution counter indicated generally at 22 will not be described as it is well known in the industry. It is structured to convey information about the number of revolutions of the shaft with which it is associated and through a series of mechanical output shafts to be connected with a volume-revolution corrector 24. Also connected with the corrector are a pressure tap 26 and a temperature tap 28 extending through the surface of housing 12 to measure the physical properties of the gas inside the housing.

It will be observed that the inlet opening 18 into the housing 12 is at a 90° angle to the inlet 30 into the meter 10. Thereby, when gas flows into the housing 12 through the inlet opening 18 it will not surge directly into the meter inlet 30. Rather, the gas will encounter somewhat of a plenum chamber which will allow particles and droplets bourne by the flowing gas to drop by gravity to the bottom of the housing 12 and not be conveyed through inlet 30. Thereby, the internal structure of the meter will avoid a large share of grit and liquid contamination which tend to wear the precisely machined parts of the meter.

Note the opening in the bottom of housing 12 in FIG. 2 which is filled by a drain plug 32. Periodically the plug 32 will be removed to purge liquids and some solid particles from the bottom of the housing 12.

The meter 10 includes a plurality of parts which, together make up an enclosure consisting of a cup-shaped end 34 bolted to a central section 36 which in turn is bolted to a short duct 38. The duct 38 is shown bolted to the inside surface of plate 14 and this is the preferred embodiment but it is not necessary that the duct 38 be bolted to the plate, there are other means for mounting and aligning of the operable elements of this invention. Alternative embodiments will be self-evident from the following description and an observation of the drawings.

A pair of walls 40 and 42 are shown sandwiched between the central section 36 and those adjacent sections which are bolted thereto. The purpose of the walls is to divide the interior of meter 10 into compartments. The central compartment 44 is intended to convey gas from the meter inlet 30 to the meter outlet 46. Compartments 48 and 50 on the left and right-hand sides of the central compartment or gas chamber 44 will have functions which will be described subsequently.

Impellers 52 and 54 are best seen from a functional standpoint in FIGS. 4A through 4D and they will be explained subsequently. Each impeller is mounted on a composite shaft 56, 58 and the two shafts are mounted in parallel to project through walls 40 and 42 for rotation. The shafts are supported in the walls by ball bearings 60.

On the right-hand side of the meter within chamber 50 are a pair of gears 62, 64 with their peripheral teeth in meshing relationship, thereby, proper orientation of the impelers is maintained at all times. An oil slinger disk 66 is shown mounted on the lower of the two gears 64 and it will be observed that the lower edge of the oil slinger 66 is immersed in a puddle of oil 68 in the compartment 50. It will also be observed that the teeth of gear 64 do not engage the surface of the oil puddle. The oil slinger is designed to fling droplets of oil upward during the rotation of the shaft 56 and thereby provide lubrication for the gears 62 and 64 and the bearings 60. It is not inoperable to have the gear teeth of gear 64 engage the surface of the oil 68 but it is preferred that only the lower edge of the oil slinger 66 penetrate the surface of the oil. Excess oil droplets could tend to contaminate the gas passing through chamber 44 should excess oil from the chamber migrate by capillary action along the shafts supported by the bearings 60.

In the left-hand chamber 48 a similar oil slinger 66 is mounted on a part of the magnetic coupling to perform the same function as the oil slinger in the right-hand chamber 50 which is mounted on the gear 64.

Figure 3:
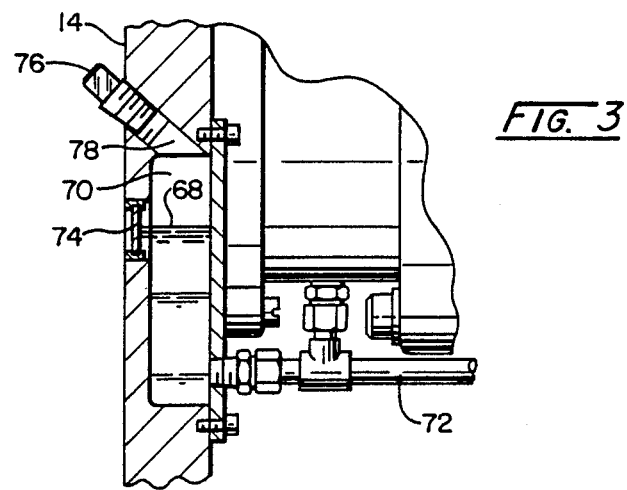
FIG. 3 is a fragmentary sectional view taken along line 3—3 of FIG. 1.

Looking to FIGS. 1 and 3, a cavity or reservoir 70 is formed in plate 14 to serve as a reservoir to resupply the oil 68 in the bottom of chambers 48 and 50. Tubing 72 is connected in fluid communication between the reservoir 70 and the two chambers 48 and 50 by conventional plumbing apparatus which is illustrated but need not be described. Thereby, the level of oil in the chambers and the reservoir will be the same. A gauge or sight glass 74 which is transparent allows an operator to observe the level of oil in the reservoir and by appropriate indicia can determine whether the oil is at a suitable operating level.

Should the oil be to low, the operator may fill the reservoir by removing threaded plug 76 from a fill duct 78 and oil may be added to the reservoir as needed.

In assembly of the apparatus as shown in FIG. 2, the meter will be inserted into the housing 12 and the plate 14 will be bolted loosely into place. Then a nipple 80 will be inserted through housing outlet opening 20 and threaded into the meter outlet 46. Note that the nipple 80 has a radially extending flange closely associated with the interior surface of outlet opening 20. To prevent leakage of gas from housing 12, an elastomeric O-ring 82 is mounted in a groove in the nipple flange to sealingly engage the interior surface of opening 20.

After the nipple 80 is threaded into place, the bolts securing the plate 14 to the housing 12 will be tightened as needed.

A choke (not shown) will be provided in or adjacent opening 20 and the function of the choke is to minimize gas flow through opening 20 to about 120% of the rated flow capacity of the meter 10. The choke may be in the form of a plate bolted to the outside of the radially extending flange adjacent the opening 20 or it might be an integral part of the nipple 80. A choke generally shown according to this invention will be described in more detail in association with the alternative structure in FIG. 5.

Looking now to FIGS. 4A–D the operation of the meter and the impellers will be explained. Gas flows into the central section 36 as shown in FIG. 4A through opening 30 and initially into the lower quadrant 84 as impeller 54 rotates in a counterclockwise direction towards the horizontal position.

Figures 4A, 4B, 4C, 4D:
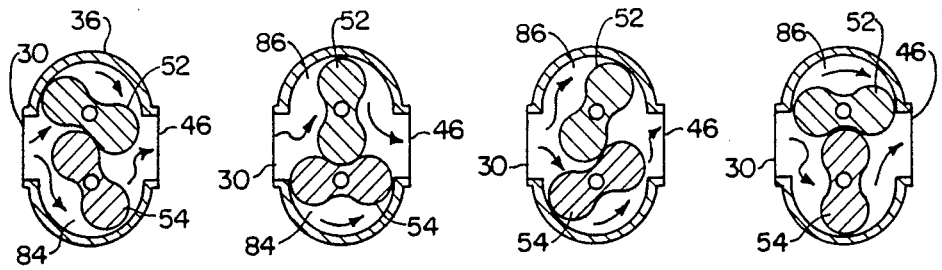
FIGS. 4A through 4D show the sequential operation of the internal structure of the meter of this invention, the views being in section taken along line 4—4 of FIG. 2.

In FIG. 4B the impeller 54 is in horizontal position and a definite volume of gas is contained in lower quadrant 84. At this point gas continues to enter through inlet 30 and moves upward into upper quadrant 86.

As the impeller 54 continues to turn as shown in FIG. 4C, the volume of gas in lower quadrant 84 is discharged through outlet 46.

In FIG. 4D the impellers have continued to turn and the top impeller 52, rotating in the clockwise direction, has confined another known quantity and equal volume of gas.

This process is repeated four times for each complete revolution of the impeller shafts. The pressure of the flow of gas through inlet 30 creates the momentum for the rotation of the impellers.

Figure 5:
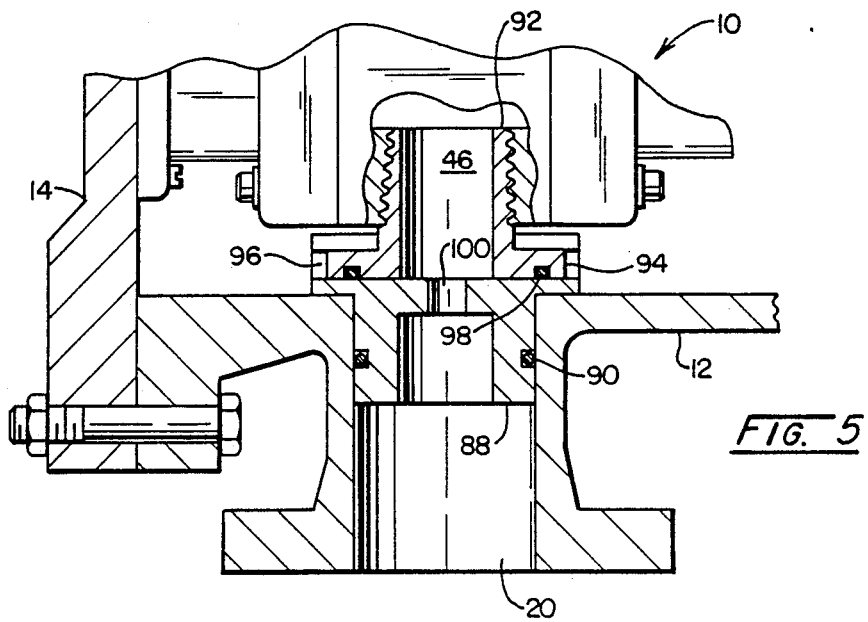
FIG. 5 is a fragmentary sectional view of an alternative structure for the connection between the housing outlet opening and the outlet from the flow meter.
Figure 6:
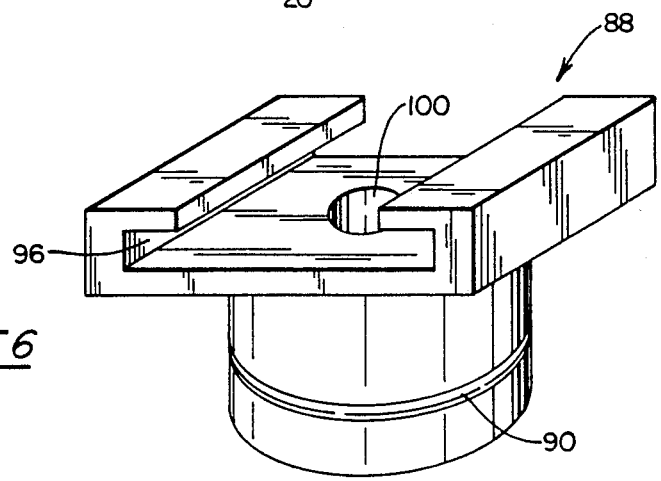
FIG. 6 is a perspective of the coupling and choke combination shown in FIG. 5 to connect the meter outlet to the housing outlet opening.

Looking to FIGS. 5 and 6, a second embodiment is illustrated for the connection between the meter outlet and the housing outlet opening. A connector or coupling 88 shown in perspective in FIG. 6 is mounted in the outlet opening 20 from the inside of the housing when the plate 14 is removed and before the meter 10 is inserted into place. It includes a groove 90 containing an elastomeric O-ring for sealing against the surface of the outlet opening 20. A flanged nipple 92 is threaded into outlet 46 in the meter 10 prior to the time the plate 14 is assembled on the housing 12. The flange 94 on the nipple 42 is designed to slide into the slot 96 in the coupler 88, thereby locating the meter and it s outlet in proper physical relationship with the outlet opening 20 in the housing 12. Note the groove 98 in the face of flange 94 which includes an elastomeric O-ring to engage the surface of the slot 96. The O-rings in grooves 0 and 98 serve to seal the outlet passage against leakage of gas from the cavity formed by the housing 12. The fact that the nipple 92 is threaded into a rigid position and that the connector 88 is not rigidly fixed to the housing 12 allows a certain amount of play in the assembly operation without losing the integrity of the fluid seal.

It will be noted that a choke 100 or passage of reduced cross-sectional area is provided as a part of the connector 88 and the size of the choke 100 is to be correlated with the rated flow capacity of the meter 10 such that the maximum flow rate of the gas through the choke 100 will be not more than about 120% of the rated flow capacity of the meter. It is preferred that the choke be an integral part of the connector 88 but as an alternative a separate choke plate could be bolted to the flange around the outlet opening 20 and it would be equally effective.

Having thus described the invention in its preferred embodiment, it will be clear to those having ordinary skill in the art that modifications may be made in the structure without departing from the spirit of the invention. It is not intended that the invention be limited by the drawings nor the words used to describe the same, rather it is intended that the invention be limited only by the scope of the appended claims.

I claim:

1. A meter for measuring volume flow of gas at high pressures comprising, a housing including (1) an inlet opening for receiving said gas, (2) an outlet opening for discharging said gas, and (3) an open end, said open end being covered by a plate which seals the housing against any gas leaks, a gas flow meter mounted in said housing and in fluid communication with said inlet and outlet openings, said meter being configured to receive gas from the interior of said housing, measure the volume of gas passing through the meter and discharge said gas through said outlet opening, said meter including an enclosure, said enclosure including wall means for internally dividing the enclosure into a plurality of chambers, one of said chambers being exclusively used to measure and transmit gas, said wall means supporting a movable element in said gas transmission chamber, said movable element being supported on said wall means by a bearing, and an oil chamber in said enclosure partially filled with lubricating oil, said bearing being located out of direct contact with said lubricating oil, means associated with said movable element for lubricating said bearing with said lubricating oil when said element moves.

2. The meter of claim 1 including a gauge visible from outside the enclosure to show the level of lubricating oil in the oil chamber.

3. The meter of claim 2 including means for adding oil to the oil chamber without removing the plat from the housing.

4. The meter of claim 3 including means for aligning an outlet from the gas transmission chamber with the outlet opening of said housing.

5. The meter of claim 4 including means for sealing the gas transmission chamber outlet to the housing outlet opening in gas tight engagement to prevent gas in said housing from leaking through said housing outlet opening.

6. The meter of claim 1 including means for adding oil to the oil chamber without removing the plate from the housing.

7. The meter of claim 6 including means for aligning an outlet from the gas transmission chamber with the outlet opening of said housing.

8. The meter of claim 7 including means for sealing the gas transmission chamber outlet to the housing outlet opening in gas tight engagement to prevent gas in said housing from leaking through said housing outlet opening.

9. The meter of claim 1 including means for aligning an outlet from the gas transmission chamber with the outlet opening of said housing.

10. The meter of claim 9 including means for sealing the gas transmission chamber outlet to the housing outlet opening in gas tight engagement to prevent gas in said housing from leaking through said housing outlet opening.

11. The meter of claim 2 including means for aligning an outlet from the gas transmission chamber with the outlet opening of said housing.

12. The meter of claim 11 including means for sealing the gas transmission chamber outlet to the housing outlet opening in gas tight engagement to prevent gas in said housing from leaking through said housing outlet opening.

13. The meter of claim 1 including means for sealing the gas transmission chamber outlet to the housing outlet opening in gas tight engagement to prevent gas in said housing from leaking through said housing outlet opening.

14. The meter of claim 2 including means for sealing the gas transmission chamber outlet to the housing outlet opening in gas tight engagement to prevent gas in said housing from leaking through said housing outlet opening.

15. The meter of claim 3 including means for sealing the gas transmission chamber outlet to the housing outlet opening in gas tight engagement to prevent gas in said housing from leaking through said housing outlet opening.

16. A meter for measuring volume flow of gas at high pressures comprising,
    a housing including (1) an inlet opening for receiving said gas, (2) an outlet opening for discharging said gas, and (3) an open end, said open end being covered by a plate which seals the housing against any gas leaks,
    a gas flow meter mounted in said housing and in fluid communication with said inlet and outlet openings,
    said meter being configured to receive gas from the interior of said housing, measure the volume of gas passing through the meter and discharge said gas through said outlet opening,
    said meter including an enclosure, said enclosure including wall means for internally dividing the enclosure into a plurality of chambers, one of said chambers being exclusively used to measure and transmit gas, said wall means supporting a movable element in said gas transmission chamber, said movable element being supported on said wall means by a bearing, and
    means for aligning an outlet from the gas transmission chamber with the outlet opening of said housing.

17. The meter of claim 16 including means for sealing the gas transmission chamber outlet to the housing outlet opening in gas tight engagement to prevent gas in said housing from leaking through said housing outlet opening.

18. The meter of claim 17 including mans for lubricating said bearing by movement of said element.

19. The meter of claim 16 including means for lubricating said bearing by movement of said element.

20. The meter of claim 16 including a choke associated with said housing outlet opening for limiting gas flow to about 120% of the meter rating.

* * * * *